United States Patent [19]

Porter

[11] Patent Number: 5,721,852
[45] Date of Patent: Feb. 24, 1998

[54] METHOD AND APPARATUS FOR DISPLAYING A SPLIT BAR WINDOW

[75] Inventor: Dan R. Porter, Beaverton, Oreg.

[73] Assignee: Intel Corporation, Santa Clara, Calif.

[21] Appl. No.: 669,576

[22] Filed: Jun. 24, 1996

Related U.S. Application Data

[63] Continuation of Ser. No. 298,145, Aug. 30, 1994, Pat. No. 5,559,946.

[51] Int. Cl.$^6$ .......................................... G06F 3/14
[52] U.S. Cl. .................. 395/349; 395/334; 395/341
[58] Field of Search ......................... 395/326, 339, 395/340, 341, 342, 343, 344, 345, 346, 347, 348, 352, 349, 350, 351

[56] References Cited

U.S. PATENT DOCUMENTS

| | | | |
|---|---|---|---|
| 5,229,996 | 7/1993 | Backstrom et al. | 370/100.1 |
| 5,312,478 | 5/1994 | Reed et al. | 395/148 |
| 5,321,828 | 6/1994 | Phillips et al. | 395/500 |
| 5,396,587 | 3/1995 | Reed et al. | 395/145 |
| 5,414,848 | 5/1995 | Sandage et al. | 395/650 |
| 5,416,895 | 5/1995 | Anderson et al. | 395/148 |

OTHER PUBLICATIONS

Microsoft Corporation, "Microsoft Word for the Apple Macintosh", pp. 88–89, 1984.
Microsoft Corporation, "Microsoft Word for Windows", Version 2.0, pp. 56–57, 1991.

*Primary Examiner*—Thomas G. Black
*Assistant Examiner*—Ruay Lian Ho
*Attorney, Agent, or Firm*—Blakely, Sokoloff, Taylor & Zafman

[57] ABSTRACT

An apparatus and method for using a generalized windows split bar and tab bar library in a conferencing system handles windows display functions in order to free application programs from having to include such functionality. The split bar library is responsible for positioning a split bar window separating two other display windows. The split bar library includes a feature for automatically preventing the display of a title bar window when its corresponding display window is not concurrently displayed. The tab bar library allows easy access to information tagged by a tab. A special function tab is displayed which can be selected by the user by manipulating an input device. The special function tab allows the insertion of a new tab and a new page of information. Automatic scrolling tabs appear when the number of tabs to be displayed exceeds the amount of space available to display all of the tabs. The scrolling tabs allow access to the non-displayed tabs.

24 Claims, 14 Drawing Sheets

METHOD AND APPARATUS FOR DISPLAYING A SPLIT BAR WINDOW

This is a continuation of application application Ser. No. 08/298,145, filed Aug. 30, 1994, now U.S. Pat. No. 5,559,946.

BACKGROUND OF THE INVENTION

1. Field of the Invention

The present invention relates to the field of multiple window displays in computer systems. Specifically, the present invention relates to the field of extended windows library functions in a computer system. Although the described embodiment is described in terms of a computer conferencing system, the extended windows library functions can be used for various other types of computer applications which use multiple window displays.

2. Description of Related Art

A set of personal computers interconnected on a network can be effectively used as a data conferencing system. In such a system, each conference participant typically comprises a personal computer user having a computer, a screen display, a computer network interface and typically a mouse or cursor control device. Conference participants are linked together by a computer network. This network may comprise either a hardwired local area network (LAN) such as Ethernet, a telephone modem link or other conventional data communications network. Because the conference participants are linked via a computer network, the participants do not need to be located in the same physical space. Rather, an effective conference may be carried out as participants view common information on their local screen displays and manipulate information using their local cursor control devices or other input devices.

Several problems are present in these prior art conferencing systems. In a typical conferencing application, a group of conference participants linked via a network share common information pertaining to a particular meeting or topic under discussion. By sharing information between conference participants, each participant is able to view and manipulate the information dispersed during the meeting. Immediately after a meeting is initiated, a pool of information collected during the meeting begins to accumulate. As each conference participants makes modifications or additions to this pool of meeting information, the individual contributions must be circulated around to the other conference participants so that each participant has a complete and up-to-date copy of the meeting information. It will be appreciated that maintaining synchronization and currency of the meeting information among all conference participants is a difficult rusk and may involve the transfer of large mounts of information. This task is complicated by the fact that during the course of the meeting, individual conference participants may choose to create their own independent private pool of information that relates in some way to the meeting or topic under discussion. As is the case during a face-to-face meeting, some information is shared among the meeting participants and other information or notes are kept private to a particular participant.

In a typical conferencing scenario, an individual conference participant may take private notes that relate to the public subject matter under discussion at the conference. A split bar window display can be used to separate the computer display into two display windows: a first window for displaying the public information and a second window for displaying the private information.

A split bar displaying a descriptive title can be displayed along with the second window so that the user can easily differentiate the two windows. The user can then change the size ratio of the first window relative to the second window by moving this title bar which separates the windows. Thus, for example, by moving the title bar, the size of the first window can be increased with a corresponding decrease in the size of the second window. Any size ratio of the first window and second window can be created. However, if the first window is increased so as to fully encompass the display such that the second window is no longer displayed, this results in a screen configuration which can potentially cause confusion for the user. In this configuration, the display would show the first window above a title bar corresponding to the second window. Thus, a better method for displaying the title window is needed so as to reduce confusion for the user.

Additionally, tabs may be used to easily access previously-tagged information. This allows for easily skipping from one location in the dataset of an application to another location. Some limitations of the prior art are that the number of tabs was limited to a predetermined number.

SUMMARY AND OBJECTS OF THE PRESENT INVENTION

The present invention is an apparatus and method for adding extended windows library functions to a multiple window computer display. The described embodiment is described with respect to a computer conferencing system, however, the extended windows library functions can be used with any type of computer application which uses multiple window displays, and is not limited to a computer conferencing system.

The split bar library is responsible for positioning a split bar window separating two other display windows. The split bar library includes a future for automatically preventing the display of a title bar window when its corresponding display window is not concurrently displayed.

The tab bar library allows easy access to information tagged by a tab. A special function tab is displayed which can be selected by the user by manipulating an input device. The special function tab allows the insertion of a new tab and a new page of information. Automatic scrolling tabs appear when the number of tabs to be displayed exceeds the mount of space available to display all of the tabs.

It is therefore an object of the present invention to provide an apparatus and method for using certain split windows library functions and certain tab bar library functions. It is an advantage of the present invention for applications to use these window library functions thereby allowing for simplified applications which no longer need to include code for these specialized functions.

It is an object of the described invention to resize and reorient windows ina fast and efficiently manner wherein reorientation of windows herein is defined as the conversion from a screen display split into a top and bottom window separated by a horizontal split bar to a screen display split into a left and right window separated by a vertical split bar, or vice versa. It is another object of the described invention to display a split bar window as a title bar window separating two display windows, and for preventing the display of the title bar window when its corresponding display window is not concurrently displayed.

It is a further object of the present invention to provide tab bar window functions for easily accessing information in an application. It is a further object of the present invention to provide a means for easily adding a new tab and a new data page by manipulating the lab bar window functions with a user input device. It is a further advantage of the present invention to automatically provide scroll tabs for easily scrolling through the previously-defined tabs when the number of previously-defined tabs exceeds the number which can be fully displayed within the visible window.

These and other advantages of the present invention are fully described in the following detailed description of the preferred embodiment.

DETAILED DESCRIPTION OF THE PREFERRED EMBODIMENT

The present invention is an apparatus and method for using a generalized split bar library and tab bar library in a computer conferencing system. In the following detailed description, numerous specific details are set forth in order to s provide a thorough understanding of the present invention. However, it will be apparent to one of ordinary skill in the art that these specific details need not be used to practice the present invention. In other instances, well known structures, interfaces and processes have not been shown in detail in order not to unnecessarily obscure the present invention.

Figure 1:
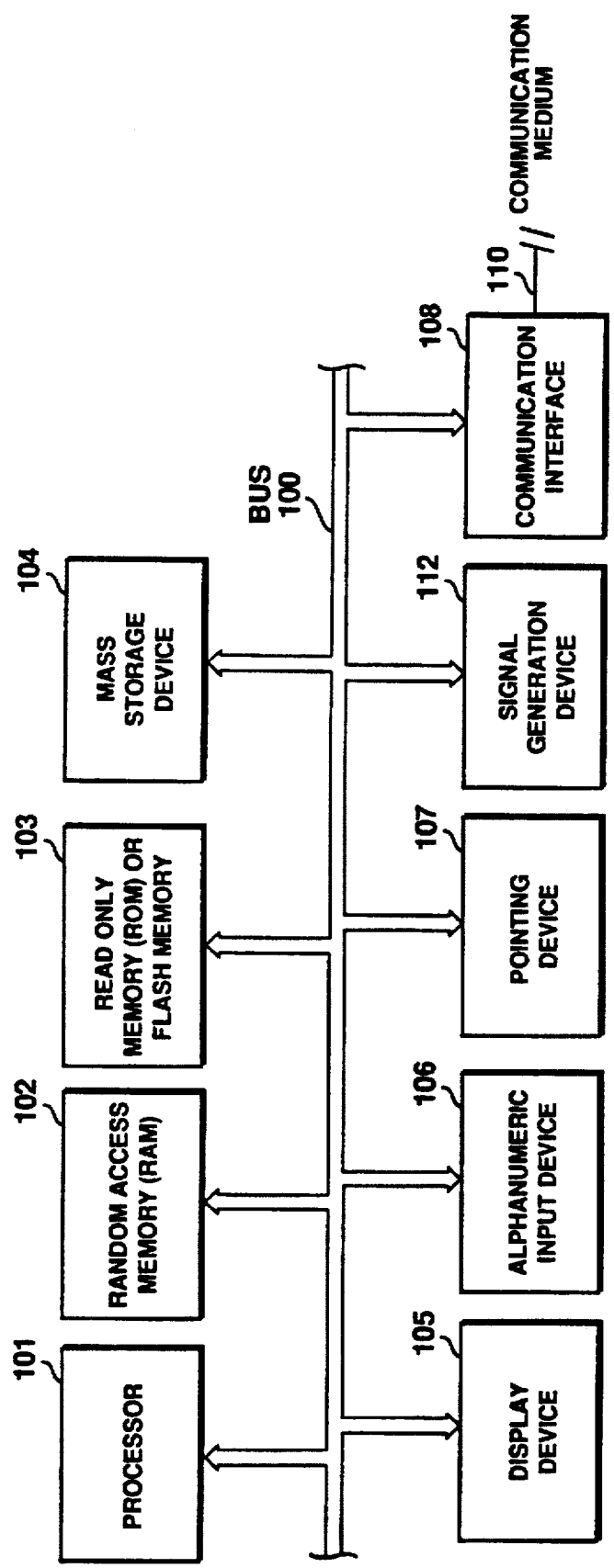
FIG. 1 is a block diagram illustrating the computer system hardware used in the preferred embodiment of the present invention.

Referring now to FIG. 1, a block diagram of the computer system hardware used in the preferred embodiment is illustrated. The computer system used in the preferred embodiment comprises a Bus 100 for communicating information between computer system components. These components coupled to Bus 100 include Processor 101. In the preferred embodiment, Processor 101 is an i486 or Pentium brand microprocessor manufactured by Intel Corporation, Santa Clara, Calif. The i486 and Pentium marks are trademarks of Intel Corporation. Other system components include Random Access Memory (RAM) 102, Read Only Memory (ROM) 103, and mass storage device or disk drive 104. The computer system of the preferred embodiment also includes display device 105 coupled to the Bus 100 for displaying information to a computer user, an alphanumeric input device 106 coupled to the Bus 100 for communicating information and command selections to the Processor 101, a pointing device or cursor control device 107 coupled to the Bus 100 for communicating information and command selections to Processor 101, and a signal generation device 112 coupled to the Bus 100 for communicating command selections to the Processor 101. Display device 105 may be a liquid crystal device, cathode ray tube, or other suitable display device. Alphanumeric input device 106 is typically an alphanumeric or function key keyboard. Pointing device or cursor control device 107 is typically a mouse or trackball device allowing the computer user to dynamically signal the two dimensional movement of a visible symbol (i.e. cursor) on the screen display of display device 105. Many implementations of the cursor control device 107 are well known in the art, including trackball, mouse, joystick, or special keys on the alphanumeric input device 106 capable of signaling movement in a given direction. Signal generation device 112 is typically implemented as a button or switch located on or near the cursor control device 107. The physical proximity of cursor control device 107 and signal generation device 112 allows a user to manipulate both devices simultaneously with one hand. The signal generation device my be operated between two control states: an active control state typically initiated by depression of a mouse button, and an inactive control state typically initiated by releasing the mouse button.

The computer system used in the preferred embodiment also includes a communication interface 108. Communication interface 108 is coupled to communication medium 110. Communication interface 108 provides a means for the computer system to communicate with a network of other computer system. A variety of other networks are well known in the art. These communication media 110 include well known Local Area Networks (LAN) such as Ethernet, Wide Area Networks (WAN), telephone modem links, or other well known and conventional computer networking technology. The configuration and interconnection of computer system components as illustrated in FIG. 1 is well known to those of ordinary skill in the art.

Figure 2:
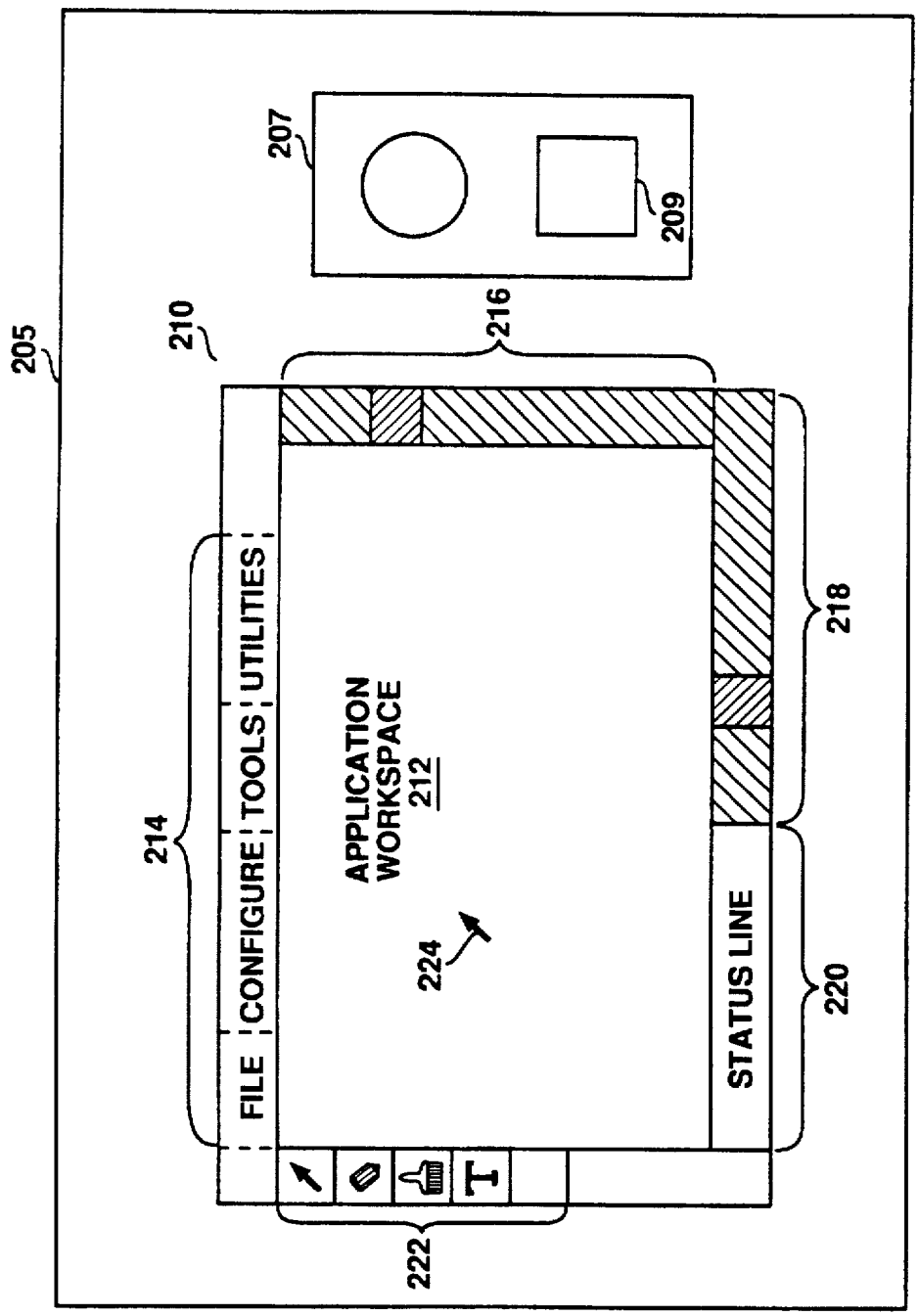
FIG. 2 illustrates a typical screen display provided in a conventional computer system.

Referring now to FIG. 2, a screen display 210 on a conventional computer system is illustrated. In addition, a cursor control device 207 (i.e. mouse) and signal generation device 209 (mouse button) is illustrated. Conventional screen display 210 comprises a displayed set or menu of function or command selections 214 displayed across the top of the screen display. In addition, tool selections 222 are displayed along a left hand edge of the screen display. Vertical scroll bar 216 and horizontal scroll bar 218 is also provided. A status line 220 provides a display region for various system status messages. This typical screen display 210 and corresponding user interface functionality is available in the prior art from various sources including the Windows operating system developed by Microsoft Corporation of Redmond, Wash., or various operating systems and applications running on the Apple Macintosh brand computer systems manufactured by Apple Computer, Inc. of Cupertino, Calif. Microsoft is a trademark of Microsoft, Inc. Apple and Macintosh are trademarks of Apple Computer, Inc.

Screen display 210 includes an application workspace 212 in which a user may draw images or type text using one of tools 222. In addition, a cursor symbol 224 is displayed and responsive to the movement to cursor control device 207. Cursor 224 provides a means for pointing to various regions on screen display 210. Again, the use of cursor symbol 224 is well known to those of ordinary skill in the art.

Figure 3:
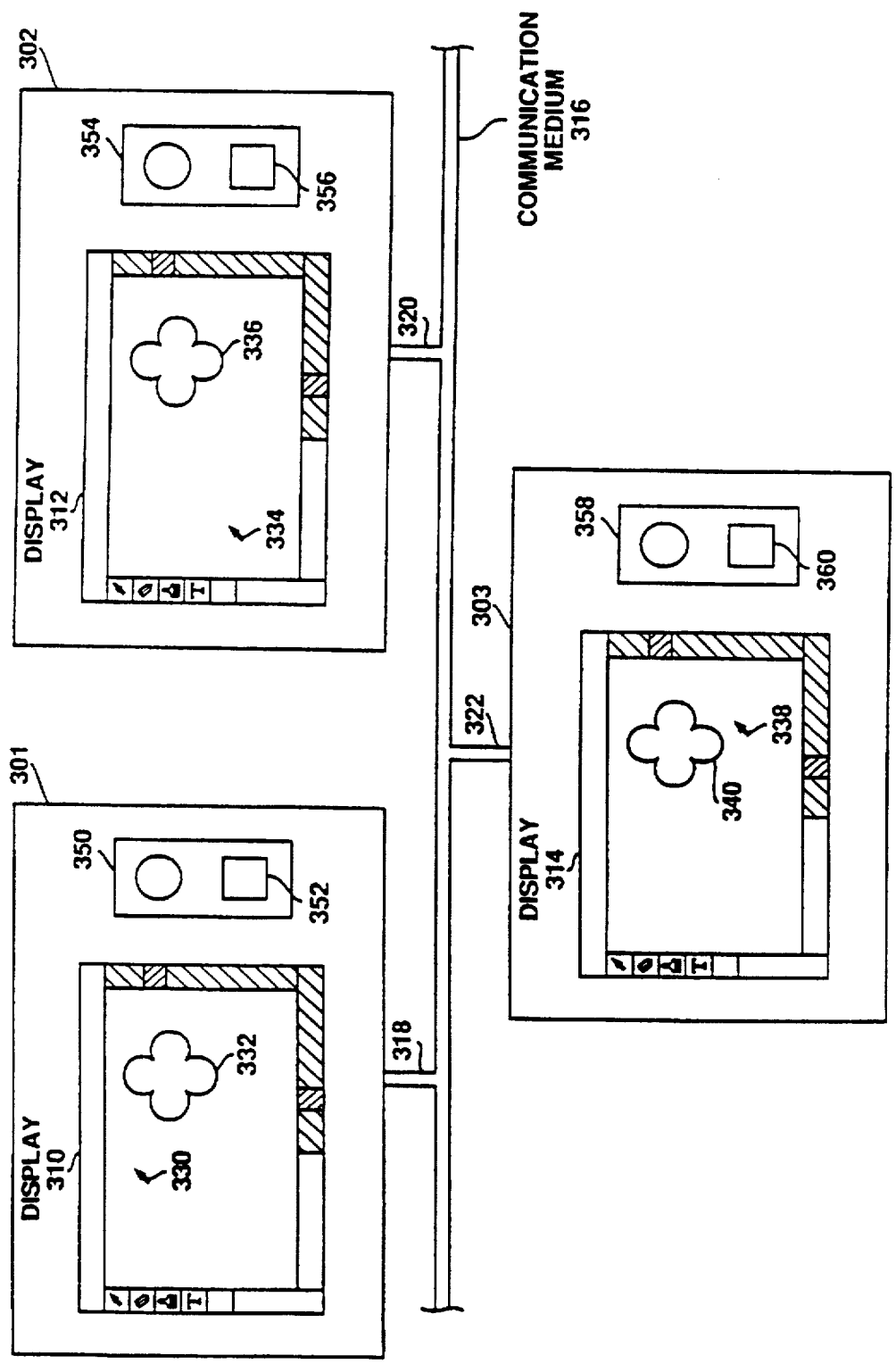
FIG. 3 illustrates a conventional computer system network having three independent computer systems interconnected on a communication medium.

Referring now to FIG. 3, a conventional computer network or conferencing system is illustrated. This sample conferencing system includes three computer systems, 301, 302 and 303, nil coupled via communication medium 316. As described earlier, these computer systems, 301,302 and 303, and the communication medium 316 over which they communicate are well known to those of ordinary skill in the art. Conventional computer system 301 includes a screen display 310, cursor control device 350, and mouse button 352. Cursor control device 350 is used to manipulate cursor symbol 330 on display 310. Because cursor 330 of display 310 is manipulated using cursor control device 350 of the same computer system 301, cursor 330 is called the local cursor of computer system 301. Any arbitrary object 332 may be displayed on screen display 310. Similarly, computer system 302 comprises screen display 312, cursor control device 354, and signal generation device 356. Local cursor 334 of screen display 312 is controlled by cursor control device 354. Computer system 303 comprises screen display 314, cursor control device 358, and signal generation device 360. Local cursor 338 of the screen display 314 is controlled via cursor control device 358.

Prior an networking systems provide means for transferring objects from one computer system to another across communication medium 316. For example, object 332 displayed on display 310 may be transferred via interface 318 across communication medium 316 to computer system 302 and/or computer system 303. In this mariner, object 332 may be displayed on display 312 as object 336 and/or displayed on display 314 as object 340. Thus, information my be shared among computer systems 301,302, and 303. Typically, cursors 330, 334, and 338 act as local cursors to the computer systems on which they are displayed.

Figure 4:
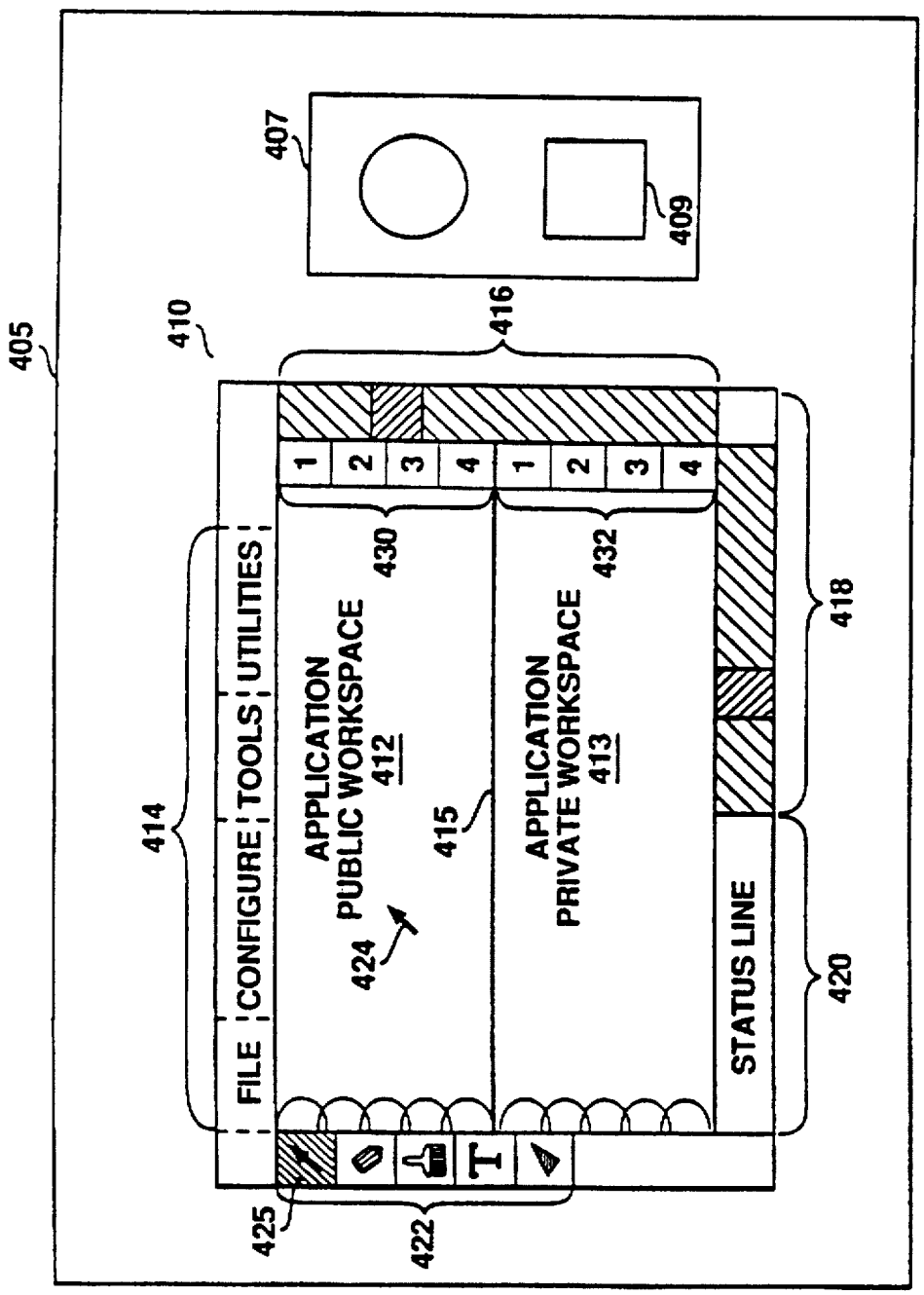
FIG. 4 illustrates the screen display provided by the preferred embodiment of the present invention. This screen display illustrates the public and private workspaces of the present invention.

Referring now to FIG. 4, a screen display 410 provided in the preferred embodiment of the present invention is illustrated. Screen display 410 includes prior art elements such as the function or command menu 414, the tool palette 422, the vertical scroll bar 416, the horizontal scroll bar 418, and optional status line 420. The preferred embodiment also uses cursor control device 407 and signal generation device or mouse button 409. In a unique diversion from the prior art, the present invention bisects the application workspace into application public workspace 412 and application private workspace 413 separated by line 415. Application public workspace 412 defines a region of display 410 that is visible to other conference participants on a network, such as the one illustrated in FIG. 3 and FIG. 4. A user of computer system 405 can select tools from tool palette 422 and draw or type annotations or objects within application public s workspace 4 12. Any annotations or objects drawn in this region are transmitted across the conferencing network as data messages. In this manner, annotations or objects drawn on a first conference participant display are visible to other conference participants on the network. Scroll bars 416 and 418 may be used in a conventional manner to select in two dimensions the portion of application public workspace 412 visible within display 410. The border 415 between application public workspace 412 and application private workspace 4 13 may be vertically moved using cursor control device 407 and signal generation device 409 in order to selectively modify the size of public workspace 412 and private workspace 413. In the preferred embodiment, local cursor 424 is positioned using cursor control device 407 over border line 415. Signal generation device 409 may then be activated to initiate movement of border 415. With signal generation device 409 activated (i.e. depressed), cursor 424 is moved vertically using cursor control device 407. As this movement occurs with signal generation device 409 activated, border 415 is moved vertically with cursor 424 until signal generation device 409 is deactivated. At this point, border 415 is left at the cursor position where signal generation device 409 was deactivated. Border 415 may be moved across the entire vertical range of the application workspace within display 410. Application private workspace 413 comprises a region of display 410 wherein objects or notations created are not transmitted to other conference participants. Annotations and objects created in application private workspace 413 using tools of tool palette 422 are only visible on the local display 410 of the computer system 405 on which the private notations or objects were created. Thus, by creating annotations or objects in either the public workspace 412 or private workspace 413, a user can quickly discern if the objects or annotations created will be visible to other conference participants.

Figure 5:
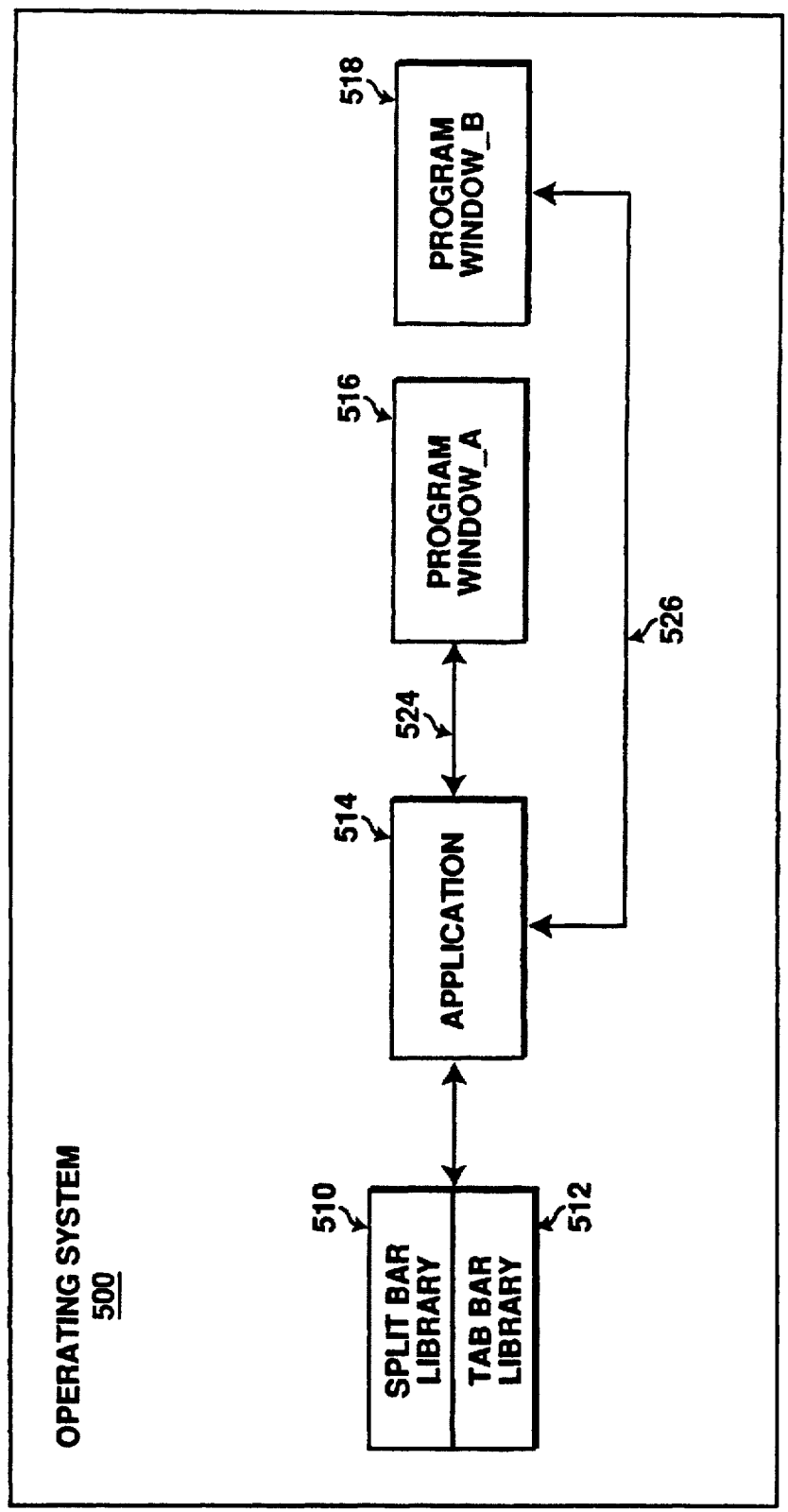
FIG. 5 illustrates a block diagram showing the relationship between the operating system and various computer programs.

FIG. 5 is a block diagram showing the relationship between the operating system 500 and various computer functions or programs 510, 512, 514, 516, and 518. The operating system 500 defines a computing environment in which various computer programs can run. For example, the Windows operating system developed by Microsoft Corporation of Redmond, Wash., is a popular operating system.

The split bar library 510 and the tab bar library 512 run under the operating system 500. Similarly, application program 514, program Window$_{13}$A 516, and program Window_B 518 run under the operating system 500.

In the described embodiment, the split bar library 510 and lab bar library 512 are separate dynamic link libraries (DLL) running under the Windows operating system. A DLL is an executable program which can be called by other application programs. However, the split bar library 510 and the tab bar library 512 can be used more generally under other operating systems and are not limited to the Windows operating system. The split bar library 510 and the tab bar library 512 also need not be executable. For example, the libraries 510 and 512 could be linked to the application 514 at compile time. Additionally, the split bar library 510 and the tab bar library 512 can be combined into a single split bar and tab bar library. Another embodiment would be to incorporate the split bar library 510 and tab bar library 512 into the operating system itself.

In the embodiment described in FIG. 5, the program Window_A 516 is responsible for displaying a first window (window A) of a screen display 410. For example, window A can be representative of application public workspace 412 (FIG. 4). Similarly, the program Window__B 518 is responsible for displaying a second window (window B) of a screen display 410. For example, window B can be representative of application private workspace 413 (FIG. 4). While in the described embodiment, program Window__A 516 and program Window__B 518 are separate programs, it is recognized that, in other embodiments, these programs could be DLLs, functions, or procedures within the application 514 or within the split bar library 510 or the tab bar library 512.

Application 514 communicates to the split bar library 510 and the tab bar library 512 via a bus 522. Additionally, Application 514 communicates to the program Window__A 516 via a bus 524 and to the program Window__B 518 via a bus 526.

Figure 6:
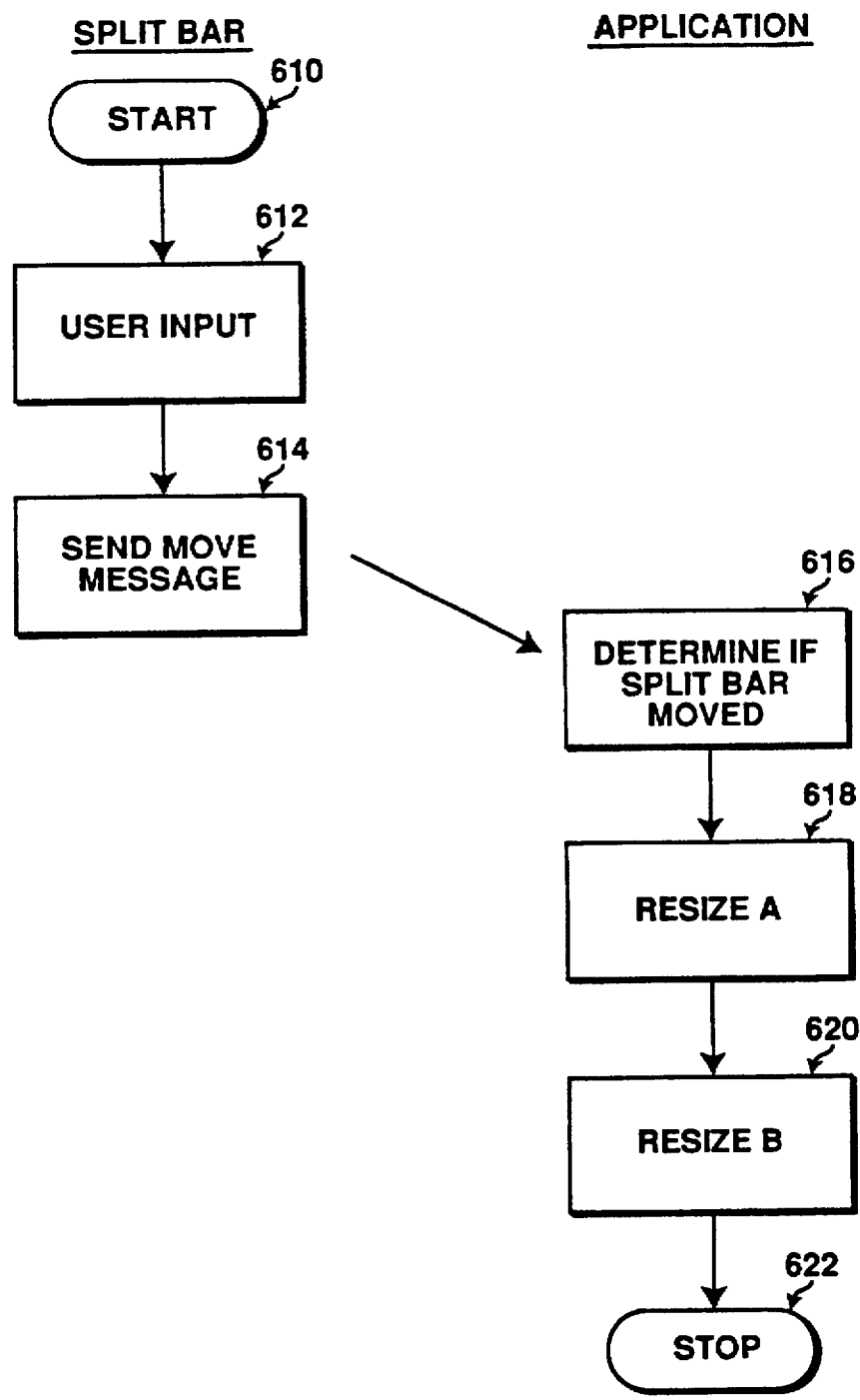
FIG. 6 illustrates a flowchart showing a prior art method of resizing a screen display separated into two windows separated by a split bar, such as the one shown in FIG. 4.
Figure 7:
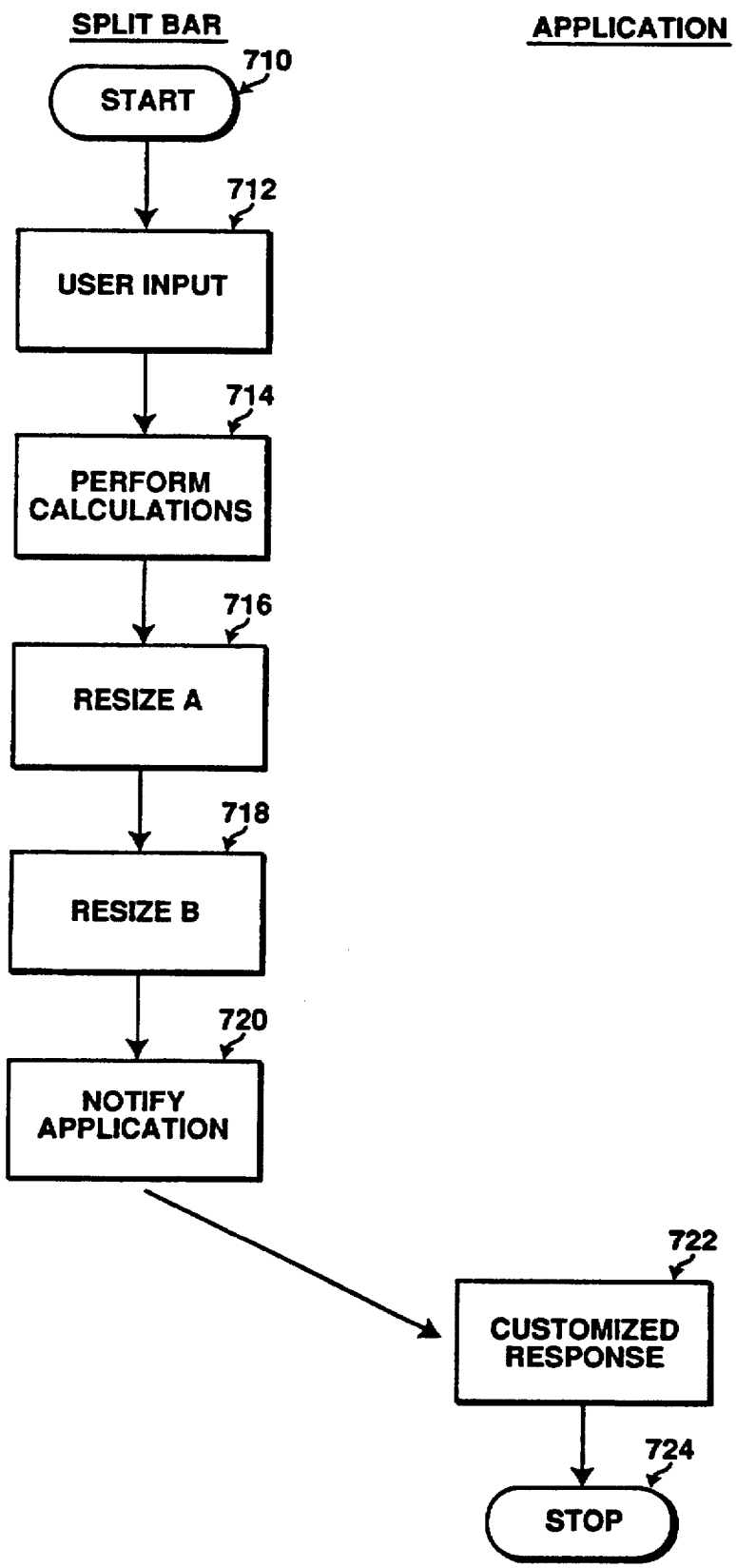
FIG. 7 illustrates a flowchart showing one embodiment of a method of resizing a screen display separated into two windows separated by a split bar, such as the one shown in FIG. 4.
Figure 8:
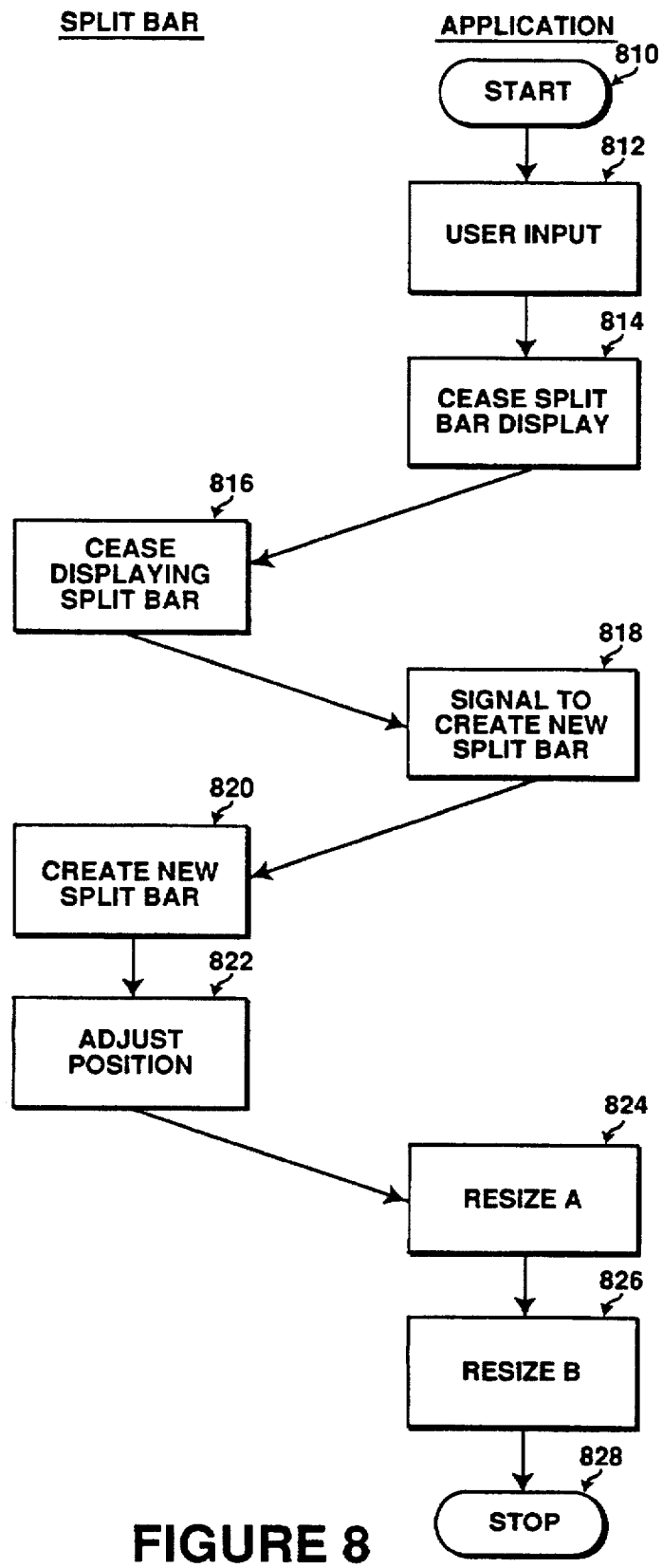
FIG. 8 illustrates a flowchart showing a prior art method of reorienting two windows separated by a split bar 415.
Figure 9:
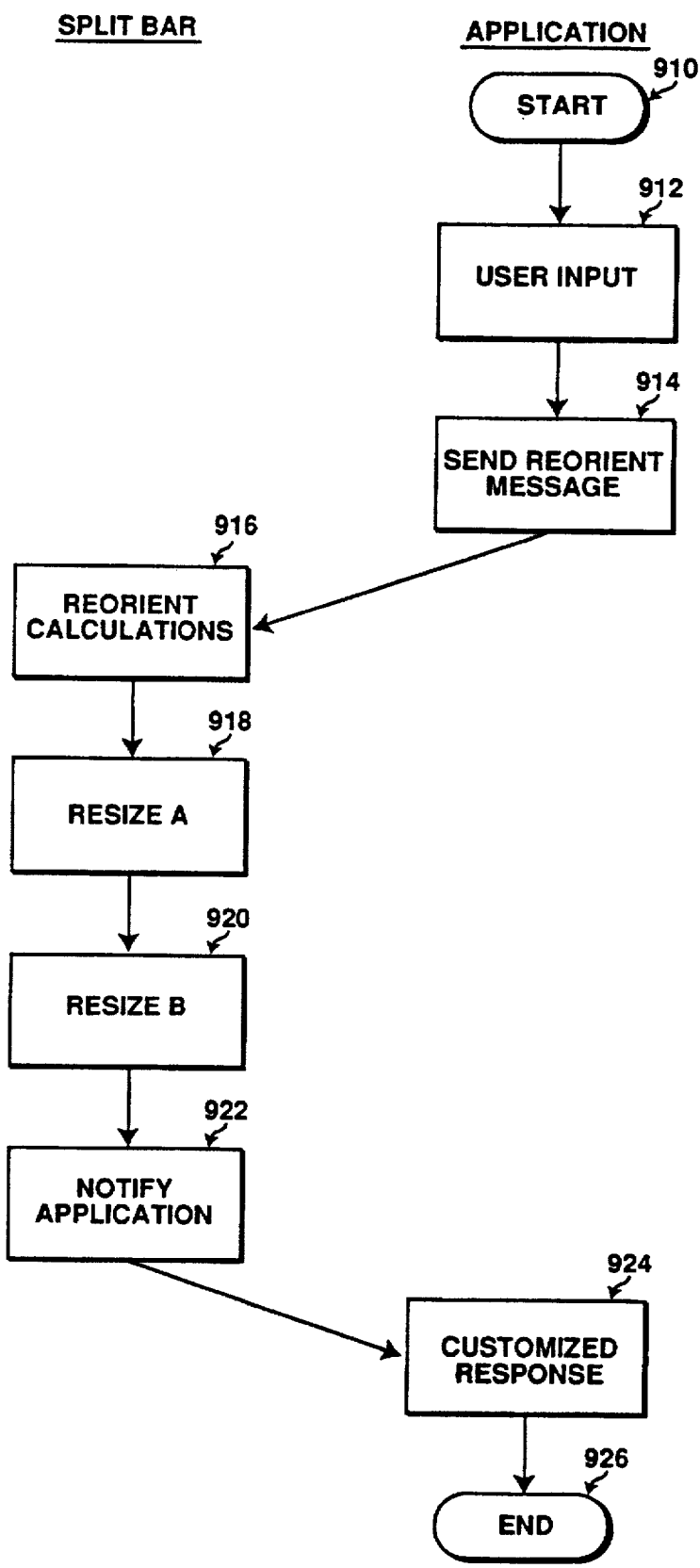
FIG. 9 illustrates a flowchart showing one embodiment of a method of reorienting two windows separated by a split bar 415.

FIGS. 6 and 7 show the advantage of the claimed invention over the prior art in resizing two windows separated by a split bar. FIGS. 8 and 9 show the advantages of the claimed invention over the prior art in reorienting two windows from a vertical configuration to a horizontal configuration, or vice versa. FIGS. 6–9 show that by allowing the split bar library 510 to handle such complex functions as resizing and reorientation, the application 514 is freed from having to handle such calculations. Thus, since the application 514 is freed from having to devote as many resources to windows display, it can more readily concentrate on its primary function FIG. 6 is a flowchart showing a prior art method of resizing a screen display 410 separated into two windows by a split bar 415, such as the one shown in FIG. 4. FIG. 6 is separated into two columns. On the left side are the steps performed by the split bar library 510, and on the right side are the steps performed by the application 514.

Operation begins at a flowchart block 610. From the flowchart block 610, operation moves to an operation block 612. At the operation block 612, the split bar library 510 receives user input indicating that the user has attempted to move the split bar as previously described with reference to FIG. 4.

From the operation block 612, operation moves to an operation block 614. At the operation block 614, the split bar library 510 sends a message to the application 514 indicating that an attempt to move the split bar 415 has occurred. Operation then proceeds at an operation block 616.

At the operation block 616, the application 514 determines whether or not the split bar 4 15 was actually moved. For example, the user may have moved the split bar 415 back and forth, but may have released the split bar in the same position at which it originated. From the operation block 616, operation moves to an operation block 618.

At the operation block 618, the application 514 signals the program Window__A 516 to resize window A if the split bar 415 has been moved. From the operation block 618, operation moves to an operation block 620, at which the program Window__B 518 resizes window B if the split bar 415 has been moved.

From the operation block 620, operation moves to a flowchart end block 622 at which operation ceases.

FIG. 7 is a flowchart showing one embodiment of a method of resizing a screen display 410 separated into two windows by a split bar 415, such as the one shown in FIG. 4. FIG. 7 is separated into two columns. On the left side are the steps performed by the split bar library 510, and on the right side are the steps performed by the application 514.

Operation begins at a flowchart block 710. From the flowchart block 710, operation moves to an operation block 712. At the operation 712, the split bar library 510 receives user input indicating that the user has attempted to move the split bar 415 as previously described with reference to FIG. 4.

From the operation block 712, operation moves to an operation block 714. At the operation block 714, the split bar library 510 performs calculations to determine whether the split bar 415 has actually moved. Operation then proceeds at an operation block 716.

At the operation 716, the split bar library 510 signals the program Window__A 516 to resize window A if the split bar 415 has been moved. From the operation block 716, operation moves to an operation block 718, at which the program Window__B 518 resizes window B if the split bar 415 has been moved. Operation then proceeds at an operation block 720.

At the operation block 720, the split bar library 510 notifies the application 514 that windows A and B have been resized. Operation then proceeds at an operation block 722.

At the operation block 722, the application 514 performs a customized response to the information that the split bar library 510 has resized windows A and B. In some cases this information is ignored. In other cases, the application may perform other operations such as repainting the screen or updating other windows in response to the resizing by the split bar library 510.

From operation block 722, operation moves to a flowchart block 724 at which operation ceases.

FIG. 8 is a flowchart showing a prior art method of reorienting two windows separated by a split bar 415. Reorientation is a conversion from a screen display 410 split into a top and bottom window separated by a horizontal split bar 415 to a screen display 410 split into a left and right window separated by a vertical split bar, or vice versa.

FIG. 8 is separated into two columns. On the left side are the steps performed by the split bar library 510, and on the right side are the steps performed by the application 514.

Operation begins at a flowchart block 810. From the flowchart block 810, operation moves to an operation block 812. At the operation block 812, the application 514 receives user input indicating that the user requested that the screen display 410 be reoriented. Operation then proceeds at an operation block 814.

At the operation block 814, the application 514 sends a signal to the split bar library 510 to cease displaying the split bar 415. Operation then proceeds at an operation block 816.

At the operation block 816, the split bar library 510 ceases displaying the split bar 415. Typically, at the same time the split bar library 510 also release the windows resources allocated to it for displaying the split bar 415. Operation is then proceeds at an operation block 118.

At the operation block 818, the application 514 signals the split bar library 510 to create a new split bar 415 with the reoriented display. Operation then proceeds at an operation block 820.

At the operation block 820, the split bar library 510 creates a new split bar 415 with the reoriented display. Operation then proceeds at an operation block 822. At the operation block 822, the position of the new split bar 4 15 is adjusted to maintain the appropriate size ratio between the two new windows separated by the split bar 415. Operation then proceeds at an operation block 824.

At the operation block 824, the application 514 signals the program Window__A 516 to resize the newly oriented window A. From the operation block 824, operation moves to an operation block 826, at which the program Window_B 518 resizes the newly oriented window B.

From the operation block 826, operation moves to a flowchart end block 828 at which operation ceases.

FIG. 9 is a flowchart showing one embodiment of a method of reorienting two windows separated by a split bar 415. FIG. 9 is separated into two columns. On the left side are the steps performed by the split bar library 510, and on the right side are the steps performed by the application 514.

Operation begins at a flowchart block 910. From the flowchart block 910, operation moves to an operation block 912. At the operation block 912, the application 514 receives user input indicating that the user requested that the screen display 410 be reoriented. Operation then proceeds at an operation block 914.

At the operation block 914, the application 514 sends a signal to the split bar library 510 to indicate that the split bar library 510 should reorient the screen display 410. Operation then proceeds at an operation block 916.

At the operation block 916, the split bar library 510 performs reorientation calculations. Operation then proceeds at an operation block 918.

At the operation 918, the split bar library 510 signals the program Window_A 516 to resize the newly created window A. From the operation block 918, operation moves to an operation block 920, at which the program Window_B 518 resizes the newly created window B. Operation then proceeds at an operation block 922.

At the operation block 922, the split bar library 510 notifies the application 514 that windows A and B have been resized. Operation then proceeds at an operation block 924.

At the operation block 924, the application 514 performs a customized response to the information that the split bar library 510 has resized windows A and B. In some cases this information is ignored. In other cases, the application may perform other operations such as repainting the screen or updating other windows in response to the resizing by the split bar library 510.

From operation block 924, operation moves to a flowchart block 926 at which operation ceases.

One advantage that the embodiment as described by FIG. 9 has over the prior art as described by FIG. 8, is that when the prior art operation block 816 of FIG. 8 ceases displaying the split bar 415, it gives up windows resources. Thus, it is possible that another application can grab these windows resources prior to the split bar library 510 reacquiring the windows resources at the operation block 820, when the split bar library 510 tries to create a new split bar 415. In this scenario, at the operation block 820, if there are insufficient windows resources for the split bar library 510 to create a new split bar 415, the application 514 may crash. This problem does not occur in the embodiment as described by FIG. 9 since the split bar library 510 never gives up the windows resources Another it possesses.

Another advantage of the described embodiment is that the split bar library 510 is more efficient than the prior art since it is able to handle various situations on its own instead of passing messages back and forth to the application program 514.

Another aspect of the described embodiment includes a method for displaying a split bar rifle bar in such a way as to reduce confusion for a user. In the described embodiment, the split bar 415 can be displayed as a title bar separating the two windows. The title bar typically is wider than the split bar and includes a title descriptive of a corresponding window. For example, the split bar 415 of FIG. 4 might be shown as a title bar displaying the words "Private Workspace" in order to aid the user by indicating the window displayed beneath the title bar.

Figure 10A:
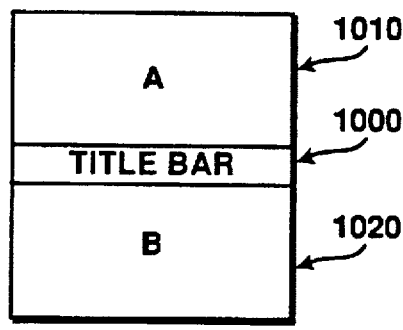
FIG. 10A illustrates a representation of a title bar separating a window A from a window B.

FIG. 10A shows a representation of a title bar 1000 separating a window A 1010 from a window B 1020. As was described with reference to the split bar 415 of FIG. 4, the title bar 1000 can be moved by using the cursor control device 407 and the signal generation device 409 in order to selectively modify the size of window A 1010 and window B 1020.

Figure 10B:
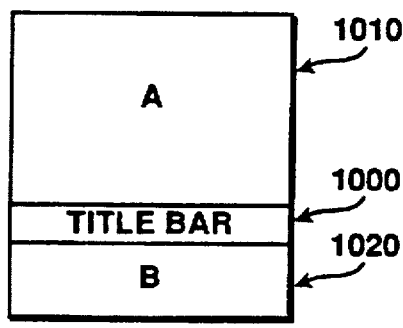
FIG. 10B illustrates the rifle bar after being moved by the cursor control device and the signal generation device.

FIG. 10B shows the title bar 1000 after being moved by the cursor control device 407 and the signal generation device 409. As the title bar 1000 is lowered, the size of the window B 1020 is diminished.

Figure 10C:
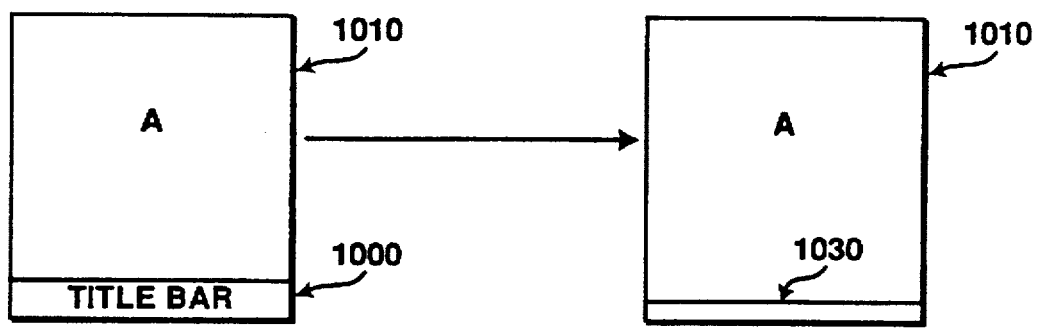
FIG. 10C illustrates the automatic removal of the title bar after being moved to the bottom of the screen display.

FIG. 10C shows the title bar 1000 after being moved to the bottom of the screen display 410 by the cursor control device 407 and the signal generation is device 409. In this position, the title bar 1000 is no longer descriptive of the window B 1020 to which it corresponds. In fact, the title bar 1000 is more likely to confuse the user into thinking that the title bar 1000 refers to the window A 1010 above the title bar 1000.

This problem is avoided by the split bar library 510 recognizing this condition of the title bar 1000 being displayed while its corresponding window is not displayed on the screen display 410. When this condition occurs, the split bar library 510 automatically eliminates the title bar 1000, and displays window A 1010 along with a split bar 1030, as shown in FIG. 10C. Window A 1010 is resized to fill in the extra space made available by the collapsing of the title bar 1000 into the split bar 1030 of a narrower size. The split bar 1030 can be subsequently moved by using the cursor control device 407 and the signal generation device 409 to re-enable the display of the title bar 1000 once the split bar 1030 is moved a distance sufficient to once again display a portion of the window B 1020.

Figure 11:
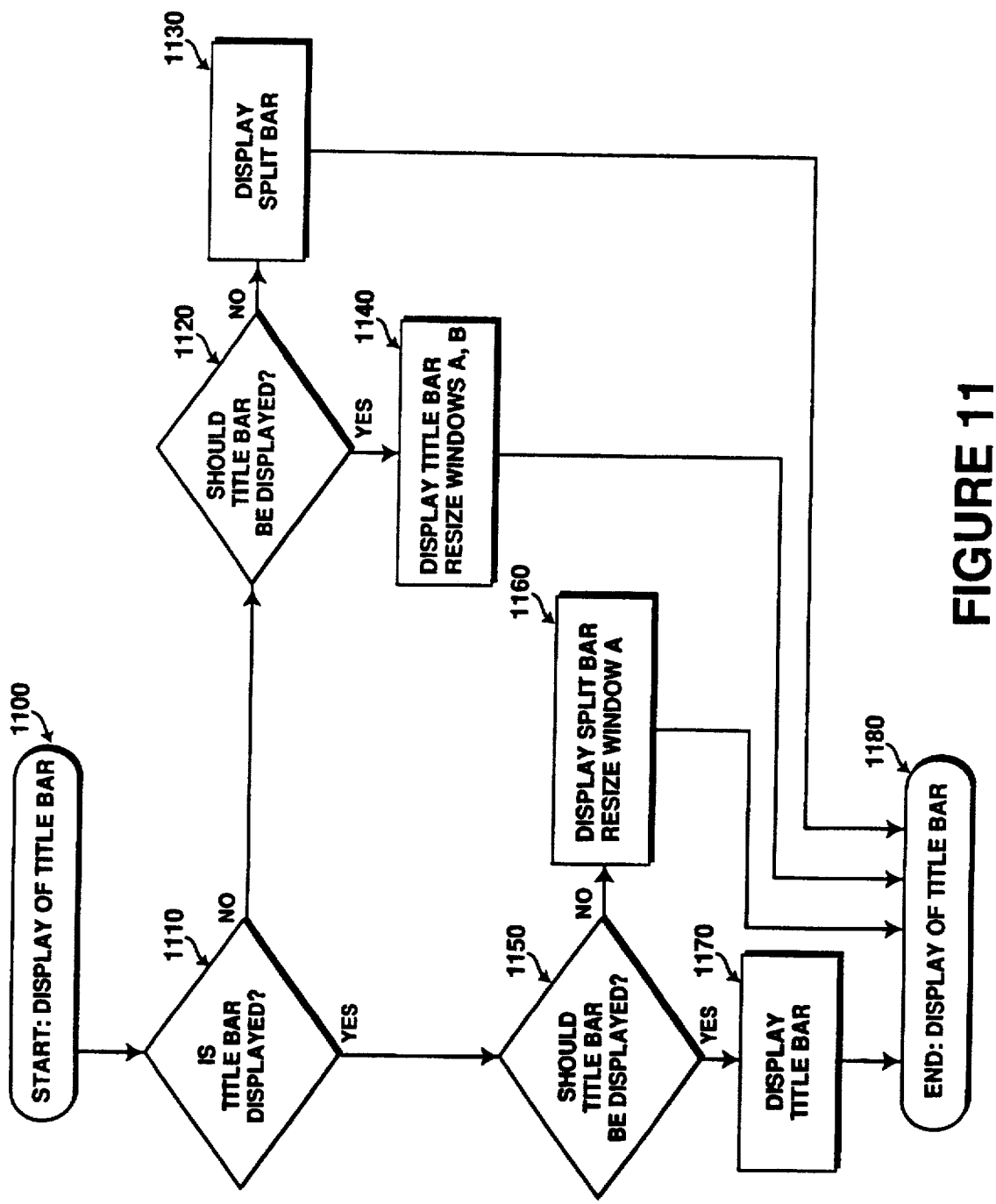
FIG. 11 is a flowchart showing the steps taken by the split bar library for selectively eliminating the title bar from the screen display.

FIG. 11 is a flowchart showing the steps taken by the split bar library 510 for selectively eliminating the title bar 1000 from the screen display 410.

Operation starts at a flowchart block 1100. From the flowchart block 1100, operation moves to a decision block 1110. At the decision block 1110, a determination is made as to whether the title bar 1000 is currently being displayed on the screen display 410. If the title bar 1000 is not being displayed on the screen display 410, and a split bar 1030 is being displayed instead, then operation moves to the decision block 1120.

At the decision block 1120, a determination is made as to whether the title bar 1000 should be displayed to the screen display 410. This decision can be based upon the window corresponding to title bar 1000 (i.e., window B 1020) not being displayable due to lack of available space, or it can be due to the title bar 1000 being displayed in a certain critical section of the screen display 410, for instance, the lower fifth portion of the screen display 410. In the described embodiment, this critical section of screen is based on the size of the windows being displayed as well as the height of the title bar 1000.

If at the decision block 1120, the title bar 1000 is not to be displayed, then operation moves to an operation block 1130, in which the split bar 1030 is However, if at the decision block 1120, the title bar 1000 is to be displayed, then operation moves to an operation block 1140, in which the title bar 1000 is displayed to the screen display 410. Additionally, at the operation block 1140, the split bar library 510 signals program Window_A 516 to resize window A 1010, and the split bar library 510 signals program Window_B 518 to resize window B 1020.

Returning to the decision block 1110, if the title bar 1000 is being displayed instead of the split bar 1030, then operation moves to the operation block 1150. At the operation block 1150, a determination is made as to whether the title bar 1000 should be displayed. As previously described, a title bar 1000 should not be displayed if either the window B 1020 is not displayable or the title bar 10430 resides in a critical section of the screen.

At the decision block 1150, if the title bar should not be displayed then operation moves to an operation block 1160, at which the split bar 1030 is displayed in place of the title bar 1000. Additionally, the split bar library 510 signals program Window_A 516 to resize window A 1010.

However, at the decision block 1150, if the rifle bar 1000 should be displayed then operation moves to an operation block 1170, at which the title bar 1000 is continued to be displayed.

From the operation blocks 1130, 1140, 1160, and 1170, operation moves to a flowchart end block 1180, at which operation terminates.

The operations described in FIG. 11 are implemented in the split bar library 510 and can be performed either before or after resizing or reorienting the screen display 410. For example, for resizing the screen display 410, the operations 1100–1180 can be implemented within any of the flowchart blocks 710–720 of FIG. 7. Similarly, for reorientation of the screen display 410, the operations 1100–1180 can be implemented within any of the flowchart blocks 916–922 of FIG. 9.

Returning to FIG. 4, both application public workspace area 412 and application private workspace are 413 are further partitioned into a plurality of pages. Each page is an instance of data to be displayed within a given workspace. Each page has a corresponding unique page identifier. A public page is a page displayed in application public workspace 412 wherein the contents of the page are transmitted to other conference participants. There is always one or more public pages available to a user. Referring to FIG. 4, public page tabs 430 provide a means for selecting a desired page within application public workspace 412. By positioning a cursor within tab areas defined within public tabs 430 and activating signal generation device 409, a particular public page can be selected and brought into view.

Similarly, a private page is a page displayed within the application private workspace 413. The contents of a private page are available only locally to the local user. The contents of a private page are not transmitted to other conference participants. Referring to FIG. 4, private page tabs 432 provide a means for selecting a particular private page of application private workspace 413. By positioning a cursor within the tab areas defined for private tabs 432 and activating the signal generation device 409, a particular private page can be selected and brought into view.

In the described embodiment, each tab of the application public workspace 412 corresponds to a unique page of the application public workspace 412. Similarly, each tab of the application private workspace 413 corresponds to a unique page of the application private workspace 413.

Figure 12:
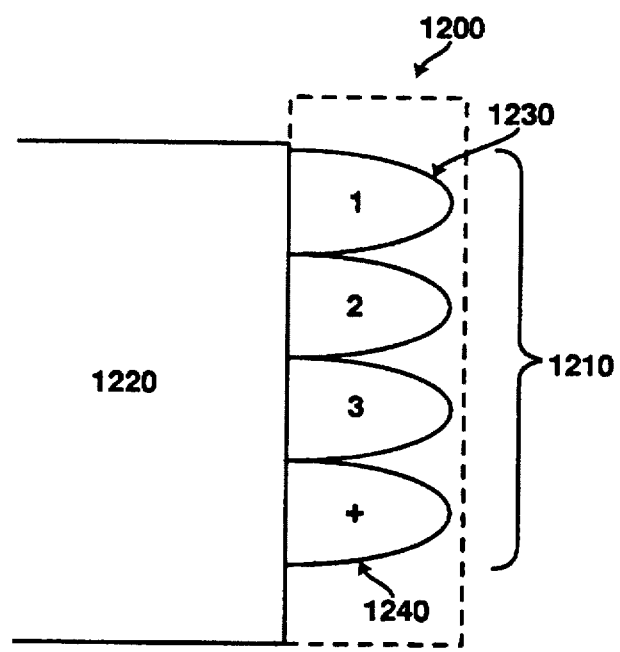
FIG. 12 illustrates a detailed example of a tab bar window.

FIG. 12 shows a detailed example of a tab bar window 1200. The tab bar window 1200 is representative of both the public page tabs 430 and the private page tabs 432.

In the described embodiment, the tab bar window 1200 includes a plurality of labs 1210 corresponding to pages of data displayed in a display window 1220. Each of the labs 1210 are numbered sequentially starting at a first lab 1230 with the number one. When one of the tabs 1210 is selected by the cursor control device 407 and activated by the signal generation device 409, the page corresponding to that selected tab is displayed in display window 1220.

The last tab is a special function tab 1240. In the described embodiment, the special function tab 1240 is designated by the "+" sign. When this tab is selected by the cursor control device 407 and activated by the signal generation device 409, the tab bar library 512 creates a new page in the dataset to which the tabs correspond. When this new page is created, the new page is displayed in the display window 1220. An unlimited number of tabs 1210 may be added to the dataset, thus creating a correspondingly unlimited number of new pages.

Figure 13:
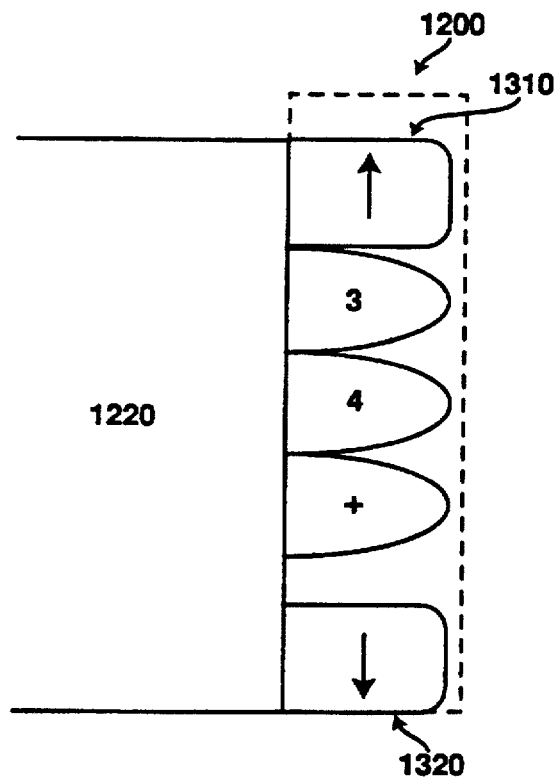
FIG. 13 shows an example of a tab bar window with scrolling arrows.

FIG. 13 shows an example of a tab bar window with scrolling arrows. In the described embodiment, when the number of labs 1210 to be displayed exceeds the amount of space available to display all of the tabs on the fight side of the corresponding window 1220, then the tab bar library 512 automatically adds scrolling arrow tabs 1310 and 1320 to the top and bottom of the tab bar window 1200 as shown by FIG. 13. By selecting the up arrow tab 1310 by the cursor control device 407 and activating the signal generation device 409, the tab bar window 1200 scrolls by one tab in an upward direction showing one additional tab which was not previously shown. If the signal generation device 409 is activated again, then an additional upward scroll will occur, and if the signal generation device 409 is held down to continuously activate this scrolling mechanism, then the scrolling will continue until the signal generation device 409 is released. Scrolling terminates when the first tab 1230 of the tab bar window 1200 is reached.

In a similar manner, by selecting the down arrow tab 1320 by the cursor control device 407 and activating the signal generation device 409, the tab bar window 1200 can be scrolled in a downward direction.

Figure 14:
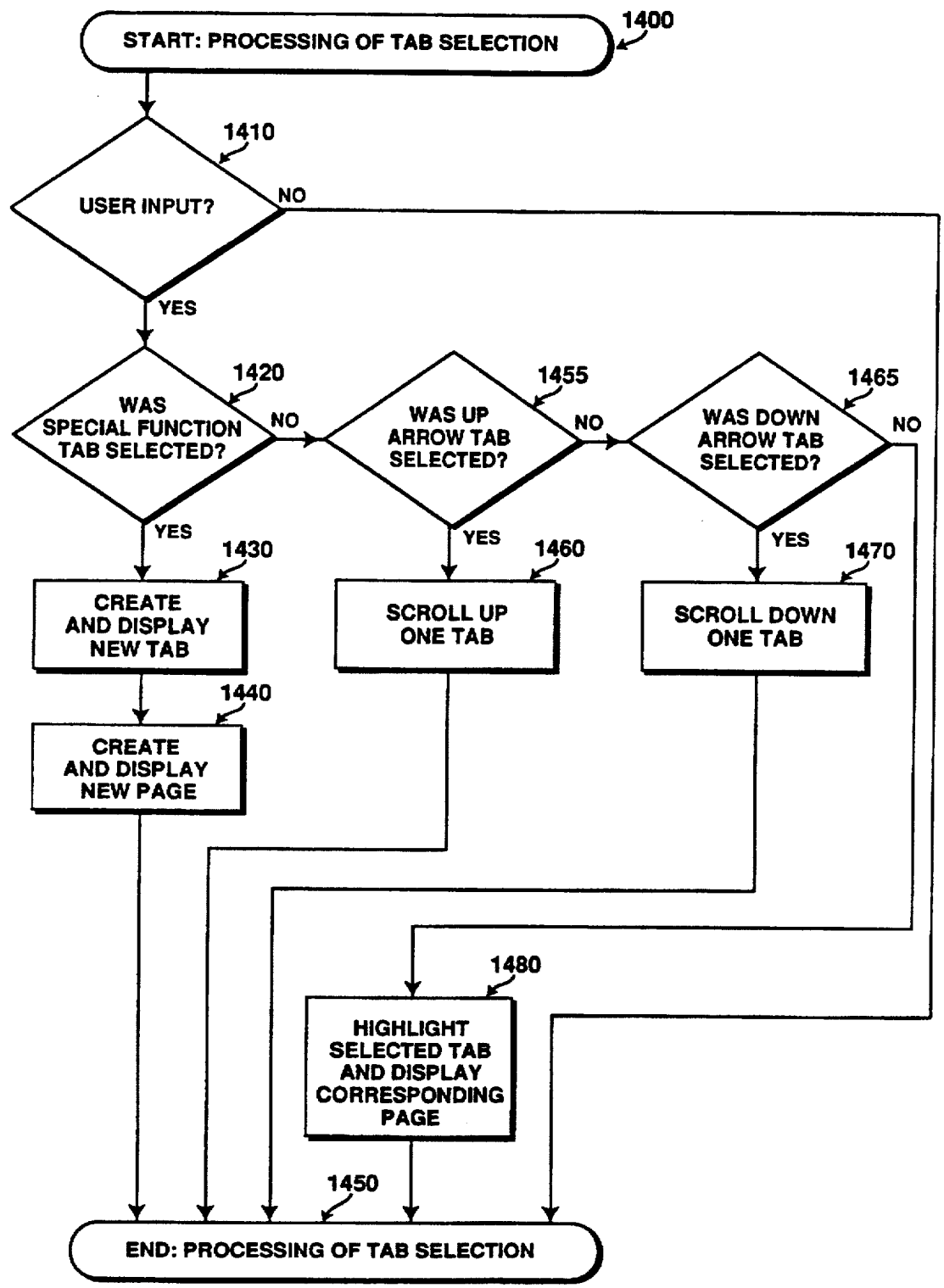
FIG. 14 illustrates a flowchart showing the steps taken by the tab bar library in response to selection of one of the tabs by a user.

FIG. 14 is a flowchart showing the steps taken by the tab bar library 512 in response to selection of one of the tabs 1210 by a user. Operation starts at the flowchart block 1400. From the flowchart block 1400, operation moves to a decision block 1410.

At the decision block 1410, a determination is made as to whether one of the tabs 1210 was selected by the user. As previously discussed, the user can select one of the tabs 1210 by manipulating the cursor control device 407 to place a cursor over one of the tabs 1210 on the screen display 410. The user then activates the signal generation device 409, for example, by pressing a button.

If there is a user input selection of one of the tabs 1210, then operation moves to a decision block 1420. At the decision block 1420, a determination is made as to whether the special function tab 1240 was selected.

If the special function tab 1240 was selected, then operation moves to the operation block 1430. At the operation block 1430, a new tab is added to the plurality of tabs 1210, and the new tab is displayed in the tab bar window 1200. Operation then moves to an operation block 1440.

At the operation block 1440, a new page is created corresponding to the new tab created in operation block 1430, and the new tab is displayed in the primary window 1220. From the operation block 1440, operation moves to a flowchart block 1450, at which operation terminates.

However, at the decision block 1410, if there is no user input selection of one of the tabs 1210, then operation moves to the flowchart block 1450 at which operation terminates.

At the decision block 1420, if the special function tab 1240 is not selected, then operation moves to the decision block 1455.

At the decision block 1455, if the up arrow tab 1310 was selected by the user input, then operation moves to an operation block 1460. At the operation block 1460, the plurality of tabs 1210 in the tab bar window 1200 are scrolled by one tab, revealing the next available lower-numbered tab. A higher-numbered may be removed from the screen display 410 to make room for the new tab. From the operation block 1460, operation moves to the flowchart block 1450, at which operation terminates.

However, if at the decision block 1455, the up arrow tab 1310 was not selected by the user input, then operation moves to a decision block 1465. At the operation block 1465, if the down arrow tab 1320 was selected by the user input, then operation moves to an operation block 1470. At the operation block 1470, the plurality of tabs 1210 in the tab bar window 1200 are scrolled by one lab, revealing the next available higher-numbered tab. A lower-numbered tab may be removed from the screen display 410 to make room for the new tab. From the operation block 1470, operation moves to the flowchart block 1450, at which operation terminates.

However, if at the decision block 1465, the down arrow tab 1320 was not selected by the user input, then operation moves to an operation block 1480. At the operation block 1480, the page corresponding to the selected lab is displayed in the primary window 1220, and the selected tab is highlighted and displayed in the tab bar window 1200. From the operation block 1480, operation moves to the flowchart block 1450, at which operation terminates.

Figure 15:
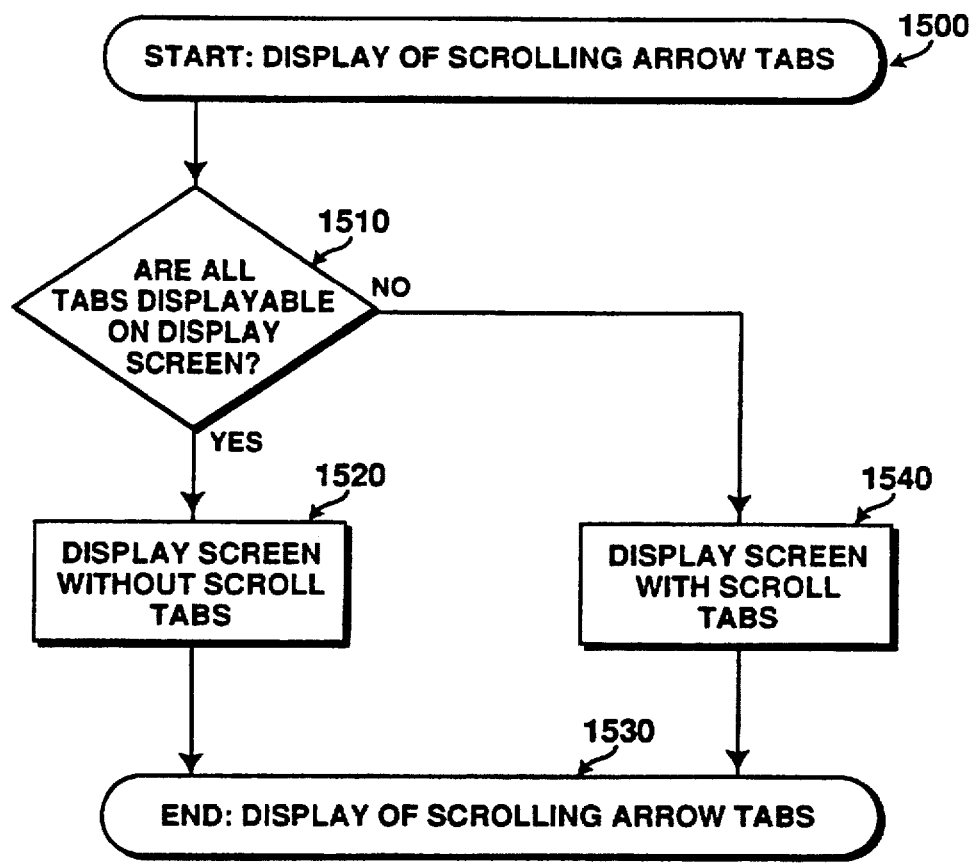
FIG. 15 illustrates a flowchart of the steps taken by the tab bar library for automatically displaying or not displaying the scrolling arrow tabs.

FIG. 15 is a flowchart of the steps taken by the tab bar library 512 for automatically displaying or not displaying the scrolling arrow tabs 1310 and 1320. Flowchart operation starts at the flowchart block 1500.

From the flowchart block 1500, operation moves to a decision block 1510. At the decision block 1510, a determination is made as to whether all of the previously-defined tabs of the tab bar window 1200 are displayable in the space allotted to the tab bar window 1200 on the screen display 410. If there is enough room to display all of the tabs of the tab bar window 1200, then operation moves to an operation block 1520.

At the operation block 1520, all of the previously-defined tabs of the tab bar window 1200 are displayed to the screen display 410. From the operation block 1520, operation moves to a flowchart block 1530, at which operation However, if at the operation block 1510, not all of the tabs of the tab bar window 1200 are displayable in the space allotted to the tab bar window 1200, then operation moves to an operation block 1540. At the operation block 1540, only a portion of the previously-defined tabs of the tab bar window 1200 are displayed to the screen display 410. Additionally, the scrolling snow tabs 1310 and 1320 are displayed on the screen display 410. From the operation block 1540, operation moves to the flowchart block 1530, at which operation terminates.

Thus, an apparatus and method for using a generalized windows split bar library and tab bar library in a conferencing system is disclosed. The specific arrangements and methods described herein are merely illustrative of the principles of this invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

What is claimed is:

1. A windowing library for providing a first display, the first display including a first primary window, a second primary window and a title bar window, the title bar window displayed between the first primary window and the second primary window, the windowing library for resizing the first primary window and the second primary window.

2. The windowing library of claim 1 wherein the title bar window is removed from the first display upon repositioning the title bar window to a predetermined area of the first display.

3. The windowing library of claim 1 wherein the title bar window includes information associated with the second primary window, and wherein the title bar window changes to a split bar window that does not include information associated with the second primary window when the title bar window is repositioned to obscure the second primary window from the first display.

4. A multiple window computer display system, the multiple window computer display system comprising:
   a processor;
   a display device coupled to the processor for displaying a visual output;
   a data input device coupled to the processor for selecting various commands by manipulating the data input device;
   an application program, the application program for providing instructions to be executed by the processor;
   an operating system, the operating system for providing an environment under which the application program is run; and
   a windowing library being interactive with the operating system and the application program for providing a first display, the first display including a first primary window, a second primary window and a title bar window, the title bar window displayed between the first primary window and the second primary window, the windowing library for resizing the first primary window and the second primary window.

5. The multiple window computer display system of claim 4 wherein the windowing library removes the title bar window from being displayed on the first display upon relocation of the title bar window, responsive to input from the data input device, to a predetermined area of the first display.

6. The multiple window computer display system of claim 4 wherein the windowing library removes the title bar window from being displayed on the first display upon termination of displaying a primary window corresponding to the title bar window.

7. The multiple window computer display system of claim 4 wherein the windowing library changes the title bar window to a split bar window upon relocation of the title bar window, responsive to input from the data input device, to a predetermined area of the first display.

8. The multiple window computer display system of claim 4 wherein the windowing library is a dynamic link library in a windowing operating system.

9. In a computer system running an application program which uses multiple windows in a screen display, the screen display including a split bar separating a first display window and a second display window, a method of resizing the first display window and the second display window, the method comprising the steps of:

(a) receiving a user input indicating that the split bar is to be moved;

(b) determining a new location for the split bar responsive to the user input;

(c) signaling a first procedure to resize the first display window;

(d) signaling a second procedure to resize the second display window; and (e) notifying the application program that the resizing of the screen display has occurred.

10. The method of claim 9 wherein the steps (a)–(e) are performed external to the application program.

11. The method of claim 9 wherein the steps (a)–(e) are performed by an operating system.

12. The method of claim 9 wherein the steps (a)–(e) are performed by a windowing library.

13. The method of claim 12 wherein the windowing library is a dynamic link library in a windowing operating system.

14. The method of claim 9 wherein the split bar is a title bar providing descriptive information to a user, the title bar corresponding to the second display window, the title bar being removed from the screen display when the second display window is no longer displayed.

15. In a computer system running an application program which uses multiple windows in a screen display, the screen display including a split bar separating a first display window and a second display window, a method for reorienting the first display window and the second display window by conerting the split bar from a horizontal configuration to a vertical configuration and from a vertical configuration to a horizontal configuration, the method comprising the steps of:

(a) receiving a user input indicating that the screen display is to be reoriented;

(b) sending a reorient message to a windowing library;

(c) performing reorientation calculations;

(d) signaling a first procedure to resize the first display window;

(e) signaling a second procedure to resize the second display window; and (f) notifying the application program that the reorientation of the screen display has occurred.

16. The method of claim 15 wherein the steps (c)–(f) are performed external to the application program.

17. The method of claim 15 wherein the steps (c)–(f) are performed by an operating system.

18. The method of claim 15 wherein the steps (c)–(f) are performed by the windowing library.

19. The method of claim 18 wherein the windowing library is a dynamic link library in a windowing operating system.

20. The method of claim 15 wherein the split bar in the horizontal configuration is a title bar providing descriptive information to a user, the title bar corresponding to the second display window, the title bar being removed from the screen display when the second display window is no longer displayed.

21. In a system that includes a screen display that features a multiple windows display in which a first window and a second window are separated by a title bar, a method of displaying the title bar comprising the steps of:

(a) performing calculations for repositioning the title bar responsive to a user input from an input device; and (b) signaling a procedure to resize the first window and the second window responsive to the user input;

wherein the steps (a) and (b) are performed by a windowing library.

22. The method of claim 21 further comprising the step of:

(c) changing the title bar to a split bar if the title bar has been repositioned to a predetermined section of the screen display.

23. The method of claim 22 wherein the windowing library is part of an operating system.

24. The method of claim 22 wherein the windowing library is a dynamic link library in a windowing operating system.

* * * * *